United States Patent [19]

Masse et al.

[11] Patent Number: 5,461,112
[45] Date of Patent: Oct. 24, 1995

[54] EPIXIDIZED MONOHYDROXYLATED BLOCK POLYMER, EPOXY RESIN, CURING AGENT AND EPOXY DILUENT

[75] Inventors: Michael A. Masse, Richmond; David J. St. Clair, Houston; James R. Erickson, Katy, all of Tex.

[73] Assignee: Shell Oil Company, Houston, Tex.

[21] Appl. No.: 437,107

[22] Filed: May 5, 1995

Related U.S. Application Data

[62] Division of Ser. No. 320,801, Oct. 11, 1994.

[51] Int. Cl.⁶ .................................................. C08F 297/04
[52] U.S. Cl. .................... 525/92 B; 525/92 F; 525/92 H
[58] Field of Search ................ 525/92 H, 92 B, 525/314, 92 F

[56] References Cited

U.S. PATENT DOCUMENTS

| | | | |
|---|---|---|---|
| 3,555,112 | 1/1971 | Winkler | 525/314 |
| 4,237,245 | 12/1980 | Halasa et al. | 525/272 |
| 4,518,753 | 5/1985 | Richards et al. | 526/178 |
| 4,663,659 | 5/1972 | Kray et al. | 525/314 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/92 |
| 5,356,993 | 10/1994 | Erickson et al. | 525/314 |
| 5,376,745 | 12/1994 | Handlin, Jr. et al. | 526/178 |

FOREIGN PATENT DOCUMENTS

| | | |
|---|---|---|
| 0396780A1 | 11/1989 | European Pat. Off. . |
| 0441485A2 | 1/1991 | European Pat. Off. . |
| 62-178718 | 7/1987 | Japan . |
| 2-275256 | 10/1990 | Japan . |
| 2-409745 | 12/1990 | Japan . |
| 06256417A | 9/1994 | Japan . |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.

*Primary Examiner*—Robert E. Sellers
*Attorney, Agent, or Firm*—Donald F. Haas

[57] ABSTRACT

The present invention provides a toughened epoxy resin composition comprising:

(a) a curable aromatic epoxy resin, (b) a monohydroxylated epoxidized polydiene polymer which is comprised of at least two polymerizable ethenically unsaturated hydrocarbon monomers wherein at least one is a diene monomer which yields unsaturation suitable for epoxidation, and wherein the polymer contains from 0.5 to 7 milliequivalents of epoxy per gram of polymer, and (c) a curing agent.

1 Claim, No Drawings

EPIXIDIZED MONOHYDROXYLATED BLOCK POLYMER, EPOXY RESIN, CURING AGENT AND EPOXY DILUENT

This is a division of application Ser. No. 08/320,801, filed Oct. 11, 1994, pending.

BACKGROUND OF THE INVENTION

The invention relates to the use of epoxidized monohydroxylated polydiene polymers as toughening modifiers for epoxy resins. More specifically, blends of epoxy resins and epoxidized monohydroxylated polydiene polymers are used for structural adhesives, coatings, especially as primers, electrical applications such as castings, coatings, encapsulants, potting compounds, solder masking compounds, and laminates and construction applications such as flooring, civil engineering, concrete repair and consolidation, secondary containment of tankage, grouts, sealants, and polymer concrete, and structural composites, and tooling, etc.

Cured epoxy resins are typically strong, rigid, hard materials. Further, because of their chemical constitution they adhere strongly to many substrate materials. These physical characteristics of cured epoxy resins make them useful in a broad range of applications. One disadvantage of cured epoxy resins is their brittle character. When subjected to impact, cyclic stresses, thermal stresses, or differences in adhesive-substrate expansivities, epoxy resins tend to fail at relatively low applied stresses in a brittle manner. The goal of much effort in this area has been to improve the toughness, or equivalently stated, the energy required to fracture, epoxy resins. Improvements in this regard lead to mechanically superior materials.

Therefore, it would be advantageous if an epoxy resin composition with increased toughness could be achieved. Importantly, the desired increase in toughness must occur with little or no sacrifice in the beneficial mechanical properties of epoxy resins such as strength, rigidity, hardness, and adhesion.

One route to this improvement is to incorporate a rubber into the epoxy matrix. Increases in toughness by incorporation of a rubber phase in an epoxy matrix are well known. Carboxy functional rubbers, as described in commonly assigned U.S. Pat. No. 3,823,107 entitled "Epoxy Resin Curing Agent Compositions, Their Preparation and Use," have been used as modifiers for epoxy resins. These carboxy functional modifiers suffer the disadvantage that they must be pre-reacted with the epoxy resin before cure so that useful improvements in properties are achieved. Anhydride or acid functional graft copolymers, as described in U.S. Pat. No. 5,115,019 entitled "Carboxy-Functional Hydrogenated Block Copolymer Dispersed in Epoxy Resin," and U.S. Statutory Invention Registration (T-4577), entitled "Epoxy Resin Composition," have been used as modifiers for epoxy resins. These rubbers also suffer the disadvantage that pre-reaction is required. Further, in some cases solvent blending and formation of emulsions of the polymeric modifier is required. The processes required to disperse these polymers possess the further disadvantage that the resulting dispersion of rubber in epoxy is sensitive to the process parameters such as temperature and shear rate during mixing, length of time of mixing, and type and amount of solvent so that inconsistent products are produced with varying properties.

A second disadvantage of epoxy resins-is their propensity to absorb water leading to lowered glass transition temperatures and lessened mechanical properties. The objective of efforts in this area has been to reduce the amount of water absorbed by incorporating strongly hydrophobic materials into epoxy resins.

Low viscosity epoxidized polydiene polymers are known to be used in modification of epoxy resins. Such polymers are described in commonly assigned U.S. Pat. No. 5,229,464. These polymers are liquid epoxidized rubbers. Compatible blends of the polymers of the above-described patent and epoxy resins are described in U.S. Pat. No. 5,332,783 which is herein incorporated by reference. The blends described in the aforementioned patent application have the disadvantage that their compatibility with epoxy resins is limited. Their limited compatibility does not extend to a broad range of epoxy resins and curing agents. Compatibilizing curing agents are required. They have the further disadvantage that even when marginally compatible, these polymers do not yield final cured epoxy resins having improved toughness. Additionally, the compatibilizing curing agents lead to cured epoxy resins have significantly reduced rigidity which makes them applicable in only limited applications.

Improvements in compatibility have been achieved through the proper choice of epoxy content, aromatic comonomer content, and residual unsaturation as described in copending commonly assigned U.S. patent application Ser. No. 228,324, filed Apr. 15, 1994, pending entitled "Epoxidized Low Viscosity Rubber Toughening Modifiers for Epoxy Resins". The monohydroxylated epoxidized polymers of the present invention possess dual functionally in that both epoxy and hydroxyl groups are present and yield novel cured epoxy resin compositions having a superior balance of properties. The monohydroxylated polymers of the present invention provide an improved balance of properties over the previous technology in that greater toughness is achieved while maintaining higher strength and rigidity. Therefore, the compositions of the present invention present a broad utility. Additionally, the monohydroxylated epoxidized polymers of the present invention are simply blended with epoxy resins before cure with no pre-reaction or solvent required. Further, it is anticipated that the aliphatic character of these monohydroxylated epoxidized polydiene polymers will reduce the amount of water absorbed by the rubber modified epoxy resin and also provide materials of relatively low dielectric constant.

SUMMARY OF THE INVENTION

This invention is a toughened epoxy resin composition containing a monohydroxylated epoxidized polydiene polymer. These monohydroxylated polymers may contain up to 60% by weight, of at least one vinyl aromatic hydrocarbon, preferably styrene. The polymers may be block or randomly copolymerized copolymers-of at least two polymerizable ethylenically unsaturated hydrocarbon monomers wherein at least one is a diene monomer which yields unsaturation suitable for epoxidation. Preferred polymers for use in this invention are described in copending, commonly assigned, U.S. patent application Ser. 08/320,807, filed Oct. 11, 1994, entitled, "Monohydroxylated Diene Polymers and Epoxidized Derivatives Thereof", filed concurrently herewith, pending, which is herein incorporated by reference. These polymers generally have a molecular weight of from 1000 to 300,000, preferably from 1000 to 100,000, and most preferably from 1000 to 20,000 and are preferably liquids. These polymers are generally epoxidized such that they contain from 0.5 to 7 milliequivalents (meq) of epoxy per gram of polymer.

DETAILED DESCRIPTION OF THE INVENTION

The preferred monohydroxylated polydiene polymer of the present invention has the structural formula $$(HO)_x—A—S_z—B—(OH)_y \qquad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties.

The invention composition includes an epoxy resin. Suitable aromatic epoxy resins include glycidyl ethers prepared by the reaction of epichlorohydrin with an aromatic compound containing at least one hydroxyl group carried out under alkaline reaction conditions. The epoxy resin products obtained when the hydroxyl group-containing compound is bisphenol-A are represented by the structure below wherein n is zero or a number greater than 0, commonly in the range of 0 to 10, preferably in the range of 0 to 2.

low viscosity, mechanical performance, and commercial availability. Other examples of aromatic epoxy resins are liquid resins such as EPON® 825, a reaction product of epichlorohydrin and bisphenol-A with an n value of about 0.04, EPON® 826, a reaction product of epichlorohydrin and bisphenol-A with an n value of about 0.08, and solid resins such as EPON® 1001, a reaction product of epichlorohydrin and bisphenol-A with an n value of about 2.3, EPON® 1002, a reaction product of epichlorohydrin and bisphenol-A with an n value of about 3.4, EPON® 1031, a reaction product of epichlorohydrin and tetraphenylol ethane with an epoxide equivalent weight of about 220, and the like.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, napthalides, biphenyls or anthracenyl derivatives. The monohydroxylated polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Specific processes for making these polymers are described in detail in copending, commonly assigned application Ser. No. 08/320,807, filed Oct. 11, 1994, "Monohydroxylated Diene Polymers and Epoxidized Derivatives Thereof", filed concurrently herewith, pending, which is herein incorporated by reference.

Conjugated diolefins which may be polymerized anionically include those conjugated diolefins containing from about 4 to about 24 carbon atoms such as 1,3-butadiene, isoprene, piperylene, methylpentadiene, phenyl-butadiene,

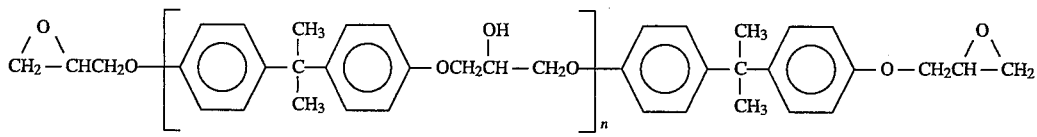

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epichlorohydrin and 2,2-bis(4-hydroxyphenylpropane) (bisphenol-A) having a molecular weight of about 400, an epoxide equivalent (ASTM D-1652) of about 185–192, and an n value (from the formula above) of about 0.13, is presently the preferred epoxy resin because of its 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The most highly preferred polymers for use herein are epoxidized diblock polymers which fall within the scope of formula (I) above. The overall molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/)

represents a random copolymer block, the diblocks may have the following structures:

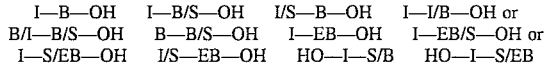

where EB is hydrogenated butadiene, —EB/S—OH means that the hydroxyl source is attached to a styrene mer, and —S/EB—OH signifies that the hydroxyl source is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain epoxidized triblock copolymers are also preferred for use herein. Such triblocks usually include a styrene block or randomly copolymerized styrene to increase the polymers glass transition temperature, compatibility with polar materials, strength, and room temperature viscosity. These triblocks may have the structures:

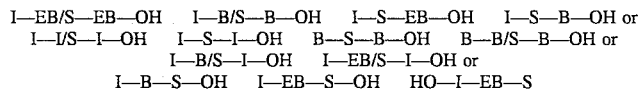

The latter group of polymers specified in the last line above wherein the styrene block is external are represented by the formula $$(HO)_x\text{—A—B—S—}(OH)_y \quad (II)$$

where A, B, S, x, and y are as described above.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. These and other methods are described in more detail in U.S. Pat. Nos. 5,229,464 and 5,247,026 which are herein incorporated by reference.

When the concentration of alkenyl aromatic hydrocarbon monomer in the monohydroxylated epoxidized polymer is less than or equal to 5%-by weight, the concentration of epoxide may range from 2 to 7 meq/g of polymer. When the concentration of alkenyl aromatic hydrocarbon monomer is from 5% up to 20% by weight, the concentration of epoxide may range from 1 to 7 meq/g of polymer. When the concentration of monoalkenyl aromatic hydrocarbon is from 20% to 60% by weight, the concentration of epoxide may range from 0.5 to 7 meq/g of polymer. If the epoxy levels are any lower, the components are anticipated to be not sufficiently compatible to toughen the resin. Because of this decreased compatibility, at lower epoxy levels, the mixing temperature will have to be undesirably high. At higher epoxy levels, the components are anticipated to be too compatible and soluble to achieve the desired phase separation upon curing. It will also raise the viscosity and the cost without any corresponding benefit. The presence of the hydroxyl group allows less epoxidation, thereby decreasing the cost of the composition without adversely affecting its performance.

The preferred epoxy levels are 2.5 to 6 meq/g for less than 5% vinyl aromatic hydrocarbon, 2 to 6 for 5 to 20%, and 1 to 6 for 20 to 60%. If the epoxy levels are lower, then cloud points of 85° C. or lower cannot be achieved without additional formulating ingredients. This is an indication of a uniform, compatible blend with uniform appearance and feel. Higher epoxy levels are not preferred because they increase the viscosity and cost without any appreciable benefit.

It has been found that by the proper combination of unsaturation, epoxide level, and alkenyl aromatic monomer content, a monohydroxylated epoxidized polydiene which possesses suitable compatibility with epoxy resins to yield an improved balance of properties can be made. The presence of epoxidation and unsaturation is required in the monohydroxylated polymers of this invention. The diene monomers remain unsaturated before epoxidation in the preferred polymers. When alkenyl aromatic monomers are present at concentrations of less than 5% by weight, the most preferred epoxide level ranges from 3 to 5 meq/g of polymer. When alkenyl aromatic monomers are incorporated at levels of 5% up to 20% by weight in the largely unsaturated polydiene block copolymer, its compatibility with epoxy resin is improved to such a degree that lower levels of epoxidation will yield improved rubber modified epoxy resins and the most preferred range is 2.5 to 4.5. When alkenyl aromatic monomers are present at concentrations of 20% to 60% by weight or greater, the most preferred epoxide level ranges from 1.5 to 4 meq/g of polymer. These ranges are believed to be optimum because they allow blends to be made with a cloud point of no more than about 70° C. (low end of range) and as low as 40° to 50° C. (high end of range). It is believed that such compositions have the proper phase separation to achieve compositions with the best combination of properties, appearance, and feel.

The ability to form suitably compatible blends with epoxy resins is one primary feature of the molecules of the present invention. While the preferred monohydroxylated epoxidized polymers are largely unsaturated, analogous hydrogenated polymers may also be suitable. In polymers of high epoxy and styrene content it is anticipated that suitable compatibility with epoxy resins will result even when all the unsaturation is consumed by hydrogenation. These polymers offer the further advantages of improved chemical resistance and improved thermo-oxidative, oxygen, ozone and ultraviolet stability.

In order to get the desired balance of properties for the compositions of the present invention, i.e., improved toughness with little or no sacrifice in strength, rigidity, or adhesion, it is important that there be some phase separation between the components in the final cured product. If the monoincorporated monohydroxylated epoxidized rubber will not phase separate from the epoxy matrix during cure, the final product will be too weak and not stiff enough for enduses such as structural adhesives, coatings, and electrical encapsulation. If the amount of phase separation is too great, then the monohydroxylated epoxidized polymer will not be finely dispersible in the epoxy matrix resulting in no property improvement and a deleterious degradation of final product appearance and product uniformity. The goal is to achieve a composition which is on the edge of compatibility and incompatibility and each epoxy resin formulation may have its own particular monohydroxylated epoxidized polydiene polymer that works best in this regard. The epoxy level, degree of unsaturation, and styrene content of the preferred polymers of this invention are specified herein to achieve such a degree of compatibility with epoxy resins.

In another embodiment of this invention, a blend of a monohydroxylated epoxidized polymer rubber polydiene used as a toughness modifier and a low molecular weight epoxy functional diluent used as a flexibilizer are simultaneously employed as modifiers for epoxy resins. These diluents include aliphatic mono-, di-, and multi-functional epoxy resins, and epoxy functional oils.

Epoxy resin matrices are typically very brittle. In order to improve their performance, their fracture toughness can be increased. Fracture toughness is a measure of energy required to fracture a material. One way to increase the energy required for fracture is to incorporate a relatively low modulus second phase in the epoxy resin matrix. This second phase acts to build in sites of stress concentration where local deformation can occur rather than catastrophic bulk deformation (brittle fracture). Also, this second phase can act to blunt or terminate growing cracks and it can absorb energy by deformation and cavitation.

However, a second mode of matrix toughening can be pursued. In this second mode, the brittle aromatic epoxy resin matrix is flexibilized by incorporating a flexible additive (diluent) molecularly into the covalent resin network. This second mode by itself would give improvements in toughness but would cause significantly more degradation of the strength and rigidity of the matrix than the first mode.

The use of both modes of toughening simultaneously leads to toughnesses higher than achievable by either mode alone. The first mode of toughening is the mode described above which is accomplished by blending with the epoxy resin a monohydroxylated epoxidized monohydroxylated polydiene polymer rubber containing a vinyl aromatic hydrocarbon which is epoxidized in an amount from 1 to 7 meq of epoxy per gram of polymer or the same polymer without vinyl aromatic hydrocarbon epoxidized at 2 to 7 meq/g. The second mode of improvement in toughening is achieved by blending with a low molecular weight reactive diluent.

The mixture of the monohydroxylated epoxidized rubber and low molecular weight reactive diluent, then, contains one fraction which due to its composition is only marginally compatible with the epoxy matrix (the monohydroxylated epoxidized rubber) and another fraction which is relatively compatible with the epoxy matrix (the low molecular weight reactive diluent). The marginally compatible fraction forms a minor phase upon curing of the epoxy resin and acts as the first mode toughener. The relatively compatible fraction is molecularly incorporated into the epoxy network and so acts as the second mode toughener. For best results, the weight ratio of the monohydroxylated epoxidized polymer to the low molecular weight reactive diluent should range from 100/1 to 1/10. The diluent may replace part of the monohydroxylated epoxidized polymer in the composition of the invention.

Examples of useful flexibilizers are aromatic monofunctional epoxy resins, aliphatic mono-, di-, and multi-functional epoxy resins, and epoxy functional oils. Examples of monofunctional epoxy resins useful herein as flexibilizers are cresyl glycidyl ether, butyl glycidyl ether, phenyl glycidyl ether, and the like. Other epoxy functional materials are also useful in the blends. Examples of epoxy functional oils include epoxidized linseed oil, epoxidized soybean oil, epoxidized castor oil, and vernonia oil. These additional epoxy functional materials are low molecular weight oils and also tend to impart lower viscosities to formulations incorporating the compositions of the present invention.

The epoxy resin/monohydroxylated epoxidized polydiene rubber compositions may be combined with epoxidized aliphatic resins, including cycloaliphatic resins, to achieve advantages in thermo-oxidative stability and weatherability. Generally, suitable epoxy resins include a broad range of liquid or solid resins characterized by the presence of, on average, at least one 1,2-epoxy group (i.e. vicinal epoxy group) per molecule. Examples of suitable epoxy resins include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, epoxy novolacs, and copolymers and mixtures thereof. These resins may replace part of the epoxy resin in the composition herein and may be present in a weight ratio of epoxy resin to aliphatic resin of 1000:1 to 1:1000. Monofunctional resins tend to impart flexibility to the product. Examples of aliphatic epoxy resins are the HELOXY® series resins (aliphatic mono-, di-, and multi-functional epoxies made by Shell Chemical Company) EPON® 871 (diglycidyl aliphatic ester epoxy made by Shell Chemical Company), and UVR-6110 (a difunctional cycloaliphatic epoxy made by Union Carbide Corporation).

The monohydroxylated epoxidized rubber modified epoxy resins can be cured by a variety of means. Suitable epoxy curing agents include anionic initiators, cationic initiators, carboxy functionalized polyesters, polyamides, amidoamines, polyamines, melamineformaldehydes, phenol-formaldehydes, urea-formaldehydes, dicyandiamide, polyphenols, polysulfides, ketimines, novolacs, anhydrides, blocked isocyanates, anhydrides, and imidazoles. The composition will generally contain from about 1 to about 60, preferably about 30 to about 60, weight percent curing agent based on the epoxy resin composition.

Anhydride curing agents are commonly used. Such anhydride curing agents may be generally described as any compound containing one or more anhydride functional groups. Most commonly used anhydrides have an aromatic, cycloaliphatic, or aliphatic structure. The curing agent may be selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids. Examples include phthalic anhydride (PA), tetrahydrophthalic anhydride (THPA), nadic methyl anhydride (NMA), hexahydrophthalic anhydride (HHPA), pyromellitic dianhydride (PMDA), methyltetrahydrophthalic anhydride (MTHPA), and dodecenylsuccinic anhydride (DSA), and the like. In addition, multifunctional carboxylic acids will provide similar performance. The anhydride is combined with the modified epoxy resins such that a suitable anhydride/ molar ratio is achieved. This ratio should range from 0.8/1.0 to 1.2/1.0 to achieve suitably complete epoxy network formation. We have found that the ratios which are most useful in achieving improved properties are those that are as close as possible to 1/1. Typically, the anhydride cures are conducted at elevated temperatures, 100° to 170° C. for a period of 30 minutes to 6 hours, and are often referred to as "bake cures." The anhydride bake cures can be accelerated by using a curing accelerator.

Suitable curing accelerators include trialkyl amines, hydroxyl-containing compounds and imidazoles. Benzyldimethylamine (BDMA), 2-ethyl-4-methylimidazole (EMI) and $BF_3$ amine complexes have been found to work well in curing the blends of the present invention.

Aliphatic amines such as diethylene triamine (DETA) and triethylene tetraamine (TETA) are useful for curing the modified epoxy resins of the present invention. Aromatic amines such as diethyltoluenediamine and metaphenylenediamine (MPDA) are useful for the curing of the compositions of the present invention. Aromatic and aliphatic amines are generally used in an equivalent ratio of from 0.8/1.0 to 1.2/1.0 by weight but it is preferred that the ratios be as close as possible to 1/1. Polyamides such as EPI-CURE® 3140 polyamide curing agent supplied by Shell Chemical Company are also useful in the cure of the modified epoxy compositions. Usually, from 30 to 130 parts per hundred parts of resin of polyamide is used. There is a wide range of reactivity of the various amines and polyamide curing agents and thus both room temperature and bake cures can be performed by proper choice of the curing agent and its proportion. Sulfonium salts of low nucleophilicity, 2-ethyl-a-methyl-imidazole, benzyldimethylamine (BDMA), lanthanide (III) trifluoromethane sulfonates, lithium perchlorate, and the like may also be used at catalytic levels (i.e., 0.1 to 10 parts per hundred parts of resin) to increase the rate of cure of the amine and polyamide curing agents.

The cured blends of the present invention may be used in structural adhesive compositions. Epoxy resins are known for their utility in such compositions. The blends of the present invention have a higher toughness when used in a structural adhesive than structural adhesives using epoxy resins alone.

Various types of fillers can be included in the epoxy resin composition. A wide variety of fillers can be used. Suitable fillers include calcium carbonate, clays, talcs, zinc oxide, titanium dioxide, silica, iron oxide, mica, alumina, antimony-trioxide, and the like. The amount of filler usually is in the range of 0 to about 65% by weight of the formulation depending on the type of filler used and the application for which the adhesive is intended. Preferred fillers are silica and titanium dioxide.

In structural composites applications, the epoxy resin composition includes reinforcing fibers. Such reinforcing fibers suitable for use are glass fibers, graphite fibers, carbon fibers, silicon carbide fibers, aramid fibers, boron fibers, alumina fibers, and the like.

Other thermosettable resins that may optionally be included in the composition include for example, polyurethane, polyureas, polyamides, brominated epoxies, phenoxy resins, polyesters, polyester-polyether copolymers, bismaleimides, polyimides, and mixtures and copolymers thereof.

The invention composition may include other additives, such as extenders, plasticizers, pigments, reinforcing agents, flow control agents and flame retardants.

Stabilizers known in the art may also be incorporated into the adhesive composition. These may be for protection during the life of the article against, for example, oxygen, ozone and ultra-violet radiation. These may also be for stabilization of thermooxidative degradation during elevated temperature processing. Antioxidants which interfere with the curing reaction should be avoided.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the absolute molecular weight of a polymer is not as straightforward or as easy to make using GPC. A good method to use for absolute molecular weight determination is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. No. Re. Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers will have different diene blocks and these diene blocks may be selectively hydrogenated as described in U.S. Pat. No. 5,229,464 which is also herein incorporated by reference. The partial unsaturation preferably is such that 1 to 7 meq/g of aliphatic double bonds remain for subsequent epoxidation.

The toughened epoxy resin compositions of this invention may be used in a broad variety of applications. They are useful in adhesives, including contact adhesives, laminated adhesives, and assembly adhesives, but they have special utility in structural adhesives where they may be combined with a broad range of curing agents to form excellent products which adhere to metals, plastic, wood, glass, and other substrates. They also have special utility in coatings (especially primers, topcoats for automotive, epoxy primers for metal, polyester coil coatings, alkyd maintenance coatings, etc.) where they may be combined with pigments and curing agents to form excellent products. Other applications for these compositions include electrical applications such as castings, encapsulants, potting compounds, solder masking compounds, and laminates and construction applications such as flooring, civil engineering, concrete repair and consolidation, secondary containment of tankage, grouts, sealants, polymer concrete, structural composites, tooling, etc.

EXAMPLES

Several performance properties of cured modified epoxy resin compositions of the present invention are important. The tensile properties such as strength, elongation, and Young's modulus are measured according to ASTM D-638. The flexural properties such as flexural modulus, stress and strain at failure are measured according to ASTM D-790. The tensile fracture toughness as characterized by the stress intensity factor ($K_{IC}$) for crack propagation is measured according to ASTM E-399-83. Using the value of $K_{IC}$ so measured, the fracture energy ($G_{IC}$) was calculated for the plane strain conditions employed. The adhesive properties such as lap shear stress are measured according to ASTM D-1002. The glass transition temperature ($T_g$) is measured using torsional bar dynamic mechanical analysis.

Table I below describes the composition of the epoxidized polydiene polymers used in the following examples. Monohydroxylated and unhydroxylated epoxidized polydienes are compared.

In the base polymer architecture column of Table I, B represents poly(1,3-butadiene) blocks, I represents polyisoprene blocks, and OH represents monohydroxyl functionality. Homopolymer blocks are separated by a dash.

The cloud points of blends of the example polymers in EPON® 828 resin at a ⅑ ratio by weight are shown in Table I. A clear and significant advantage is shown for the monohydroxylated epoxidized polymer. Very similar cloud points are achieved for the two polymers but the polymer of the present invention achieved that cloud point with only 3.4 meq/g of epoxy, 1.4 meq/g less than the comparative unhydroxylated polymer.

Example 1

11 parts of monohydroxylated epoxidized polymer A or 11 parts of the comparative monohydroxylated polymer, both having the base structure I-B were added to 100 parts of EPON® 828 resin, a diglycidyl ether of bisphenol-A. 33 parts of EPI-CURE® 3140 (a polyamide curing agent) per hundred parts of EPON® 828 resin plus epoxidized polymer were added to the mixture and stirred by hand. A small amount (less than 1 part per hundred parts of EPON®828 resin plus epoxidized polymer) of PC-1344/monofunctional glycidyl epoxy solution was added to aid in defoaming the mixture. The blend was degassed in vacuum and centrifuged. The blend was cast between glass plates to make ⅛" plaques which were cured at room temperature for 7 days before testing. The mechanical properties of the resultant rubber modified epoxy resins are listed in Table II which provides a comparison of these blends and the cured epoxy resin without added epoxidized polymer.

Incorporation of Polymer A and the comparative polymer leads to increases in fracture energy ($G_{IC}$) of 192% and 92%, respectively, while maintaining good tensile and flexural properties. These results demonstrate that the these epoxidized polymers are effective at achieving a superior balance of properties in epoxy resins cured with polyamides and that the monohydroxylated epoxidized polymer gives superior results to those of the unhydroxylated epoxidized polymer even though the latter has a higher epoxy content.

TABLE I

| | Composition of Epoxidized Polymers | | | | | |
|---|---|---|---|---|---|---|
| Identification | Base Polymer Architecture | Molecular Weights (in thousands) | Styrene Content (%) | Epoxy Level (meq/g) | Cloud Point (°C.) | Hydrogenated (Y/N)* |
| A | I—B—OH | 0.68–4.08 | 0 | 3.4 | 63 | N |
| Comparative | I—B | 0.88–4.08 | 0 | 4.8 | 68 | N |

*Y = Yes,
N = No

TABLE II

| | Mechanical Properties of Modified EPON ® 828 | | | | | | |
|---|---|---|---|---|---|---|---|
| | tensile properties | | | tensile fracture toughness | | flexural properties | |
| modifier and level | strength (psi) | elongation (%) | Young's modulus (psi) | $K_{IC}$ (psi in$^{1/2}$) | $G_{IC}$ (J/m$^2$) | modulus (psi) | $T_g$ (°C.) |
| Control | 4,000 | 14 | 340,000 | 540 | 130 | 370,000 | 60 |
| Comparative | 3,800 | 14 | 310,000 | 710 | 250 | 330,000 | 60 |
| A | 4,600 | 9.6 | 330,000 | 940 | 380 | 340,000 | 63 |

We claim:

1. A toughened epoxy resin composition comprising:
(a) a curable aromatic epoxy resin,
(b) a monohydroxylated epoxidized polydiene polymer has the structural formula $$(HO)_x\text{—}A\text{—}S_z\text{—}B\text{—}(OH)_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1, and wherein the polymer contains from 0.5 to 7 milliequivalents (meq) of epoxy resin per gram of polymer,
(c) a low molecular weight epoxy functional diluent, and
(d) a curing agent.

* * * * *